US008447436B2

(12) United States Patent  (10) Patent No.: US 8,447,436 B2
Molinaro et al.  (45) Date of Patent: May 21, 2013

(54) HANDLEBAR CONTROL SYSTEM

(75) Inventors: Frank Molinaro, Milwaukee, WI (US); Jim Williams, Waterford, WI (US); Benjamin Hodge, IV, Milwaukee, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 324 days.

(21) Appl. No.: 12/825,955

(22) Filed: Jun. 29, 2010

(65) Prior Publication Data

US 2011/0320063 A1   Dec. 29, 2011

(51) Int. Cl.
*G05D 1/00* (2006.01)
*G05G 13/00* (2006.01)
*B60K 26/00* (2006.01)

(52) U.S. Cl.
USPC .................. 701/1; 74/478; 180/333

(58) Field of Classification Search
USPC ................ 701/1; 74/335, 481, 478, 488, 491, 74/501.6, 528, 551.1; 477/79, 80, 65; 192/3.58, 192/3.62, 3.6; 180/333
See application file for complete search history.

(56) References Cited

U.S. PATENT DOCUMENTS

| | | | |
|---|---|---|---|
| 4,972,174 A | 11/1990 | Onan et al. | |
| 5,192,930 A | 3/1993 | Brueggemann et al. | |
| 5,497,036 A | 3/1996 | Zemlicka | |
| 5,519,378 A | 5/1996 | Queensbury | |
| 5,555,502 A | 9/1996 | Opel | |
| 5,767,589 A | 6/1998 | Lake et al. | |
| 5,811,891 A | 9/1998 | Yanase | |
| 5,869,907 A | 2/1999 | Marler | |
| 5,895,899 A | 4/1999 | Sano | |
| 5,990,573 A | 11/1999 | Granitz et al. | |
| 6,147,597 A | 11/2000 | Facory | |
| 6,182,807 B1 | 2/2001 | Saito et al. | |
| 6,225,584 B1 | 5/2001 | Ase et al. | |
| 6,236,918 B1 | 5/2001 | Sonoda et al. | |
| 6,344,621 B1 | 2/2002 | Shiratori et al. | |
| 6,441,510 B1 | 8/2002 | Hein et al. | |
| 6,566,998 B1 | 5/2003 | Facory | |
| 6,595,811 B2 | 7/2003 | Dagenais et al. | |
| 6,677,544 B2 | 1/2004 | Ase et al. | |
| 6,695,090 B2 | 2/2004 | McAllister | |
| 6,713,896 B1 | 3/2004 | Burtscher et al. | |
| 6,714,128 B2 | 3/2004 | Abbe et al. | |
| 6,724,102 B1 | 4/2004 | Kelwaski et al. | |
| 6,729,750 B2 | 5/2004 | Janisch et al. | |
| 6,738,701 B2 | 5/2004 | Wilson | |
| 6,841,895 B1 | 1/2005 | Kelwaski | |
| 6,903,312 B2 | 6/2005 | Miura et al. | |
| 6,915,567 B2 | 7/2005 | Nakao et al. | |
| 6,937,149 B2 | 8/2005 | McMahon | |
| 6,974,222 B2 | 12/2005 | Mascadri et al. | |
| 7,176,586 B2 | 2/2007 | Ledford et al. | |
| 7,332,684 B2 | 2/2008 | Tozuka et al. | |
| 7,346,436 B2 | 3/2008 | Altmann et al. | |
| 7,402,767 B2 | 7/2008 | Tozuka et al. | |
| 2002/0007977 A1* | 1/2002 | Ishii et al. ..................... 180/219 |

(Continued)

*Primary Examiner* — Muhammad Shafi
(74) *Attorney, Agent, or Firm* — Michael Best & Friedrich LLP

(57) ABSTRACT

A handlebar control system for a motorcycle. The system includes a controller, a network interface, a plurality of user actuated devices coupled to the controller, an electronic switch coupled to the controller, a first connector having terminals linking to motorcycle power and a network bus, and a second connector coupled to a device external to the control system.

19 Claims, 6 Drawing Sheets

U.S. PATENT DOCUMENTS

| | | |
|---|---|---|
| 2003/0121763 A1 | 7/2003 | Mengoli |
| 2004/0163858 A1 | 8/2004 | Borrego Bel et al. |
| 2004/0227402 A1 | 11/2004 | Fehr et al. |
| 2005/0173406 A1 | 8/2005 | Kurumagawa et al. |
| 2005/0174788 A1 | 8/2005 | Hood et al. |
| 2006/0059294 A1* | 3/2006 | Smith et al. ............ 710/313 |
| 2007/0051552 A1 | 3/2007 | Reed |
| 2008/0173122 A1* | 7/2008 | Bagnariol ............... 74/478 |
| 2008/0272649 A1 | 11/2008 | Order et al. |

* cited by examiner

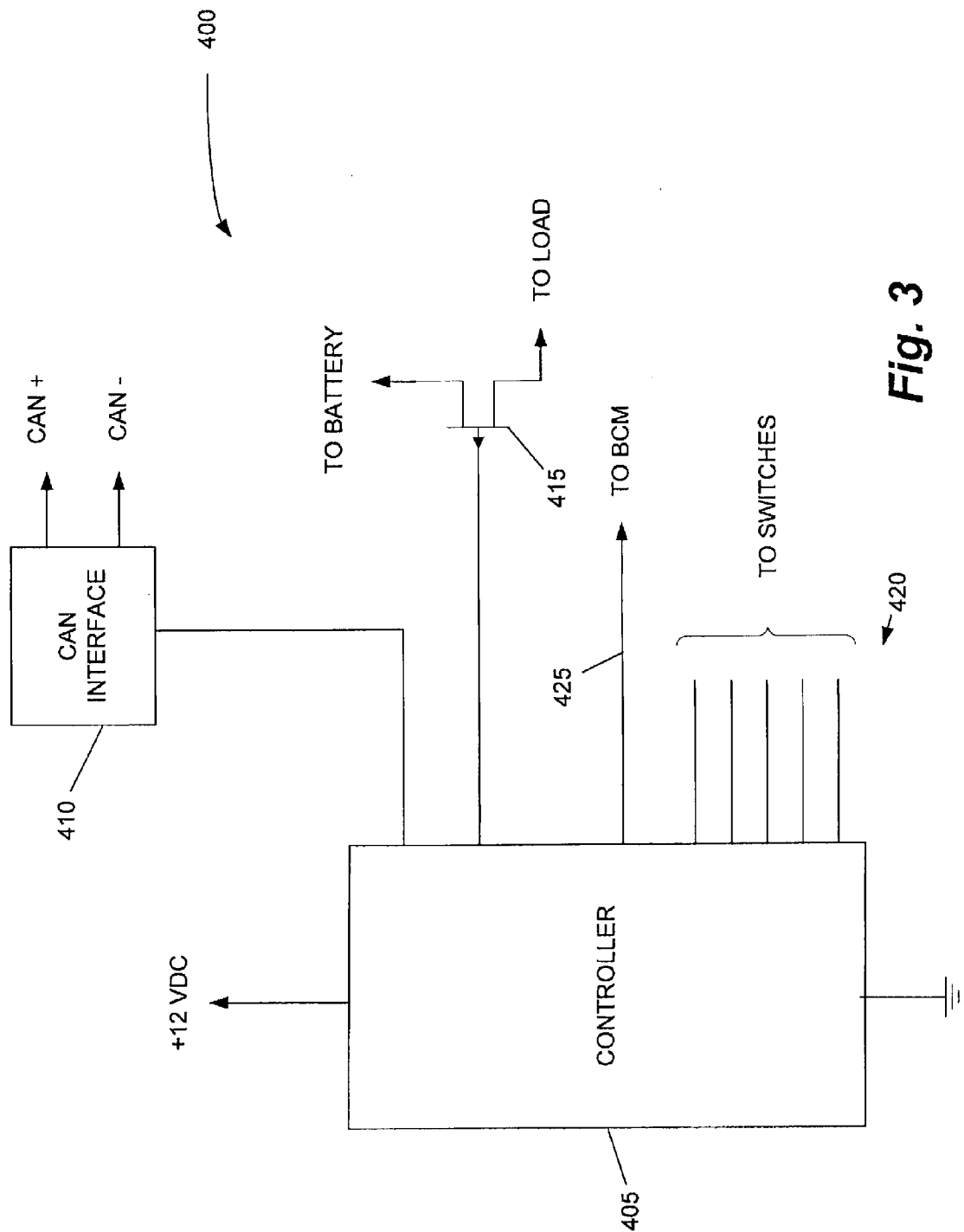

HANDLEBAR CONTROL SYSTEM

BACKGROUND

The present invention generally relates to the field of handlebar controls for motorcycles.

Traditional motorcycle handlebar controls include high current switches connected between a power source and the device being controlled. For example, a horn is turned on by a switch that is connected between the battery and the horn. When turned on, current flows through the switch and sounds the horn. The wires used with the handlebar controls are sized to handle the current drawn by the device being controlled (e.g., a lamp). This can result in the wires having a gauge of 16 awg. or more. In addition, each switch has to be directly connected to the device it is controlling. This results in large numbers of wires being routed throughout the motorcycle. Also, specialized wiring connections are needed for each modification (e.g., for incorporating optional equipment or for different motorcycle models). Performing an upgrade on a motorcycle results in wiring changes that provide an opportunity for the introduction of wiring problems (e.g., shorts, incorrect connections, etc.). Severe limitations exist as to the features that can be added to a motorcycle due to the size constraints of a motorcycle and the size and quantity of wires in the motorcycle.

SUMMARY

The invention relates to a handlebar control system that monitors the status of inputs, controls local devices based on the status and communicates the status to other devices on the motorcycle. In one embodiment, the invention provides a handlebar control system for a machine (e.g., a motorcycle). The system includes a controller, a network interface (e.g., a controller network interface), a plurality of user actuated devices (e.g., a turn-signal switch) coupled to the controller, an electronic control device coupled to the controller, a first connector having terminals linking to machine power and a network bus, and a second connector coupled to a device external to the control system.

In another embodiment, the invention provides a handlebar control system having a first handlebar controller and a second handlebar controller. The first handlebar controller includes a controller, a network interface coupled to the controller, a plurality of user-actuated devices coupled to the controller, an electronic control device coupled to the controller, a first connector having terminals coupled to machine power and a network bus, the first connector coupled to the network interface, and a second connector coupled to the electronic switch. The second handlebar controller includes a second controller, a second network interface coupled to the controller, a plurality of second user-actuated devices coupled to the controller, a second electronic control device coupled to the second controller, a third connector having terminals coupled to motorcycle power and the network bus, the third connector coupled to the network interface, and a fourth connector coupled to the electronic switch.

In another embodiment, the invention provides a method of controlling a machine having a handlebar controller including a controller, a network interface, a plurality of user-actuated devices, and an electronic control device. The method includes receiving, by the controller, a signal indicative of the status of one of the plurality of devices, detecting the status of the device, and transmitting via the network interface an indication of the status of the device. The method can further include driving a lamp, via a second controller, based on the transmitted indication that the switch is closed.

In another embodiment, the invention provides a motorcycle having a control module, a network bus coupled to the control module, and a handlebar control system. The handlebar control system includes a controller, a network interface coupled to the network bus, a plurality of user actuated devices coupled to the controller, an electronic switch coupled to the controller, a first connector having terminals linking to motorcycle power and the network bus, and a second connector coupled to a device external to the handlebar control system.

Other aspects of the invention will become apparent by consideration of the detailed description and accompanying drawings.

BRIEF DESCRIPTION OF THE DRAWINGS

FIG. 3 is a schematic diagram of a construction of a handlebar controller.

DETAILED DESCRIPTION

Before any constructions and embodiments of the invention are explained in detail, it is to be understood that the invention is not limited in its application to the details of construction and the arrangement of components set forth in the following description or illustrated in the following drawings. The invention is capable of other constructions and embodiments and of being practiced or of being carried out in various ways.

The invention is described herein using constructions of a motorcycle handlebar control system. However, the invention is applicable to other machines that are operated via a handle-grip control such as heavy construction equipment, lawn and garden equipment, power tools, three-wheeled vehicles, aircraft (e.g., via a joystick control), etc.

Figure 1:
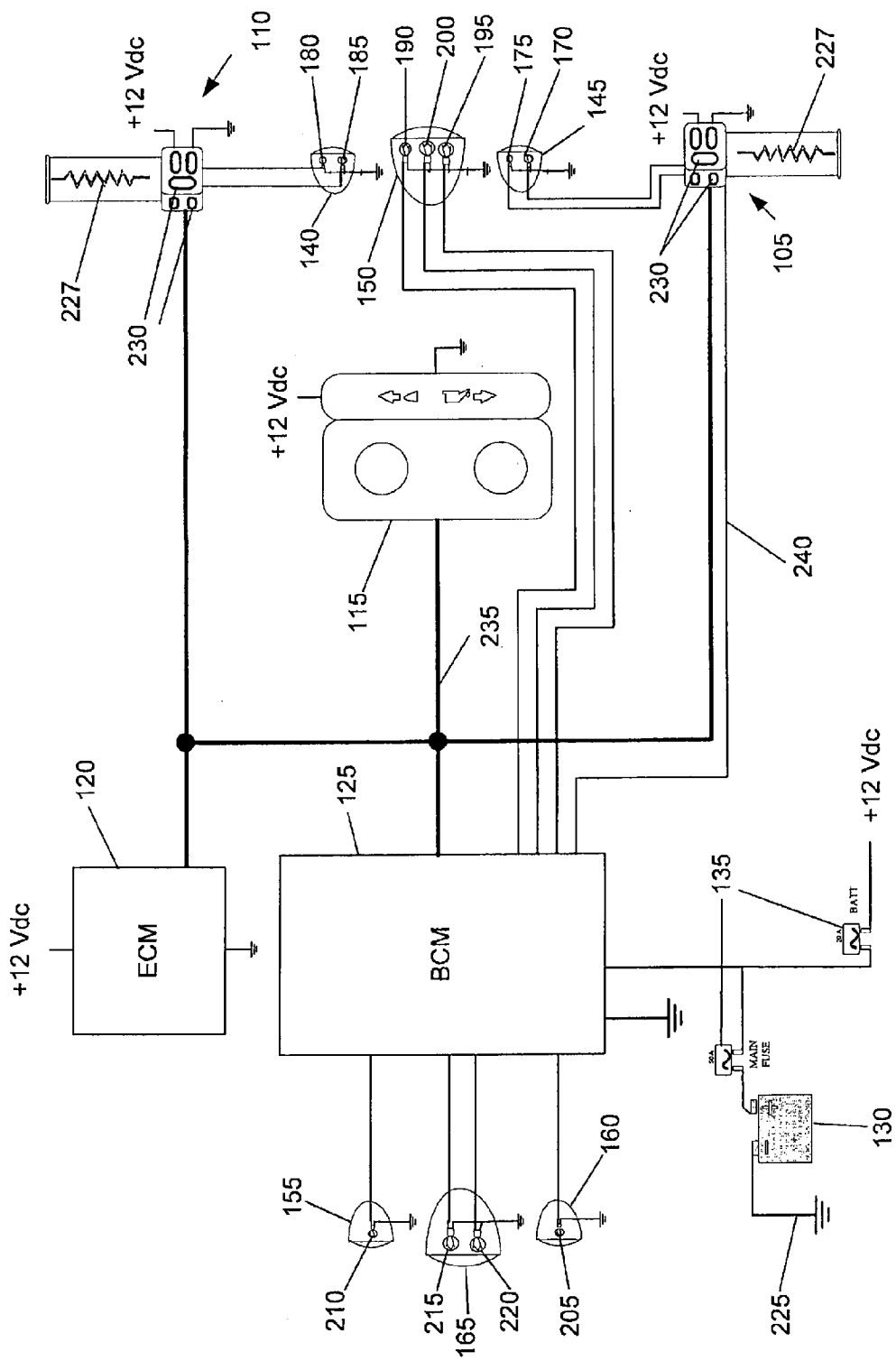
FIG. 1 is a partial wiring diagram of an exemplary motorcycle incorporating the invention.

FIG. 1 shows a partial wiring diagram for an exemplary motorcycle. The components of the motorcycle include a right-handlebar controller 105, a left-handlebar controller 110, an instrument cluster 115, an engine control module (ECM) 120, a body control module (BCM) 125, a battery 130, a plurality of fuses 135, a front-left turn-signal 140, a front-right turn-signal 145, a headlight 150, a rear-left turn-signal 155, a rear-right turn-signal 160, and a tail light 165. The instrument cluster 115 includes a tachometer, a speedometer, and a plurality of indicator lights (e.g., turn indicators, oil pressure, etc.), and can include other input/output interfaces.

In the construction shown, the front-right turn-signal 145 includes a turn lamp 170 and a run lamp 175. The front-left turn-signal 140 includes a turn lamp 180 and a run lamp 185. The headlamp 150 includes a position lamp 190, a low-beam lamp 195, and a high-beam lamp 200. The rear-right turn-signal 160 and the rear-left turn signal 155 include a turn lamp 205 and 210 respectively. The tail light 165 includes a run lamp 215 and a brake lamp 220. One connection of each of the lamps 170-220 is connected to ground 225. In some constructions, the run lamps 175, 185, and 215 are driven by the BCM 125. In other constructions, the turn-signal run lamps 185 and 175 are driven by the handlebar controllers 105 and 110 respectively. When the motorcycle is on and running, the BCM 125 (or the handlebar controllers 105 and 110) provides 12 Vdc to the run lamps 175, 185, and 215, lighting the lamps. The position lamp 190 is also driven by the BCM 125, and is powered whenever an ignition switch of the motorcycle is in an accessory position. The high-beam lamp 200, the low-beam lamp 195, the rear turn lamps 205 and 210, and the brake lamp 220 are also driven by the BCM 125. The front turn lamps 170 and 180 are driven by the right-handlebar controller 105 and the left-handlebar controller 110 respectively. "Lamp," as used herein, refers to a light emitting device, such as an incandescent bulb, a light emitting diode, etc.

The right-handlebar controller 105 and the left-handlebar controller 110 include a plurality of switches 230. In some constructions, the handle-bar controllers 105 and 110 also include a grip warmer 227. One or more control buttons, located anywhere on the motorcycle, are used to turn on the grip warmers 227 and adjust a temperature setting. The information (on/off, temperature) can be transmitted via a network bus 235 to the handlebar controllers 105 and 110 which then power the grip warmers 227.

The right-handlebar controller 105, the left-handlebar controller 110, the instrument cluster 115, the BCM 125, and the ECM 120 are all linked together by the network bus 235 (e.g., a controller area network (CAN), a local interconnect network (LIN), or other suitable network). In some constructions, the right-handlebar controller 105 and/or the left-handlebar controller 110 include one or more direct connections (i.e., non-network bus connections) to the BCM 125 (e.g., for redundancy and/or enhanced safety). In the construction shown, a run/stop switch connection 240 is provided between the right-handlebar controller 105 and the BCM 125. In some constructions, wiring for the handlebar controllers 105 and 110 is positioned inside the handlebars. In other constructions, the wiring is external to the handlebars or any combination of internal and external.

Figures 2A, 2B:
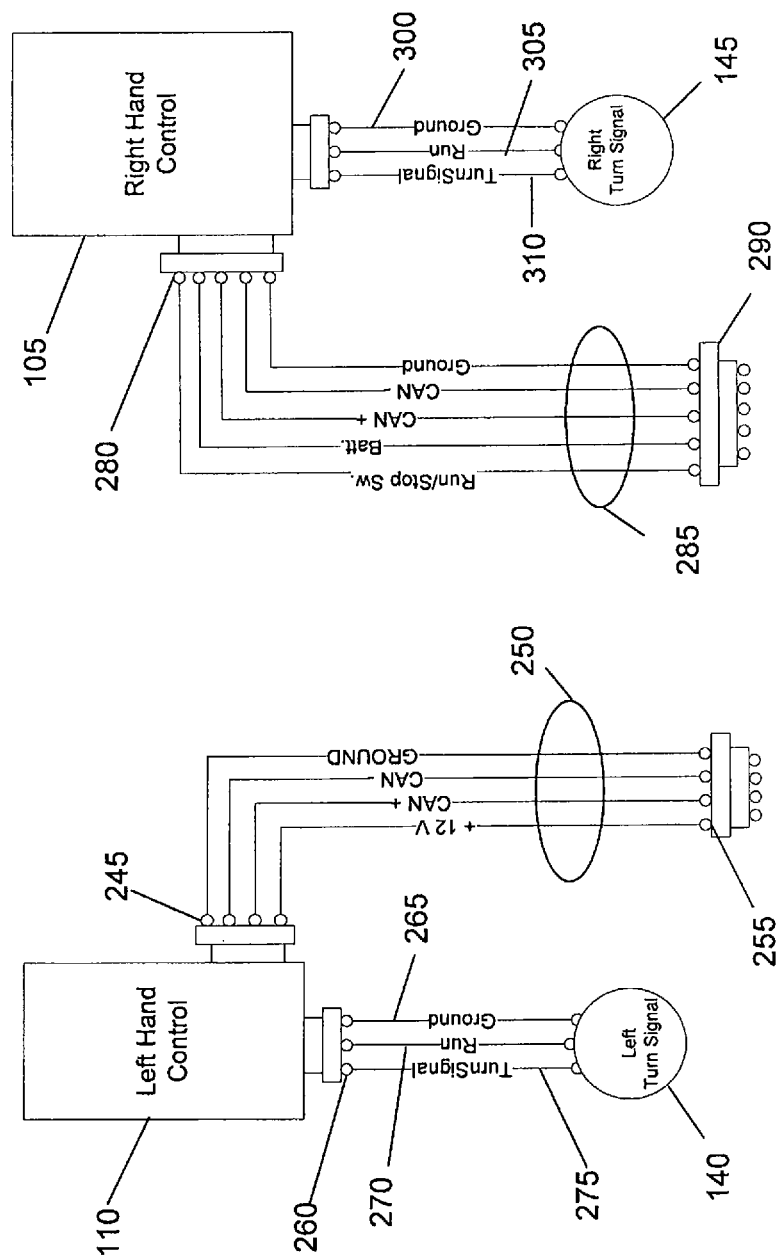
FIG. 2A is a wiring diagram for a construction of a left handlebar controller.
FIG. 2B is a wiring diagram for a construction of a right handlebar controller.

FIG. 2A shows a wiring diagram for the left-handlebar controller 110. The left-handlebar controller 110 has a four-terminal connector 245 for linking the handlebar controller 110 to the network bus 235 and power (e.g., +12 Vdc from the battery and ground). In some constructions, a cable 250 links the four-terminal connector 245 to another four-terminal connector 255 to connect to the motorcycle wiring. The left-handlebar controller 110 also includes a three-terminal connector 260 which connects to the left-turn signal 140. The three terminals provide a ground connection 265, a run signal connection 270, and a turn signal connection 275 to the left-turn signal 140.

FIG. 2B shows a wiring diagram for the right-handlebar controller 105. The right-handlebar controller 105 has a five-terminal connector 280 for linking the handlebar controller 105 to the network bus 235, to power (e.g., +12 Vdc from the battery and ground), and the run/stop switch to the motorcycle wiring. In some constructions, a cable 285 links the five-terminal connector 280 to another five-terminal connector 290 to connect to the motorcycle. The right-handlebar controller 105 also includes a three-terminal connector 295 which connects to the right-turn signal 145. The three terminals provide a ground connection 300, a run signal connection 305, and a turn signal connection 310 to the right-turn signal 145.

FIG. 3 shows a schematic diagram of an exemplary handlebar controller 400. The controller 400 includes a microcontroller 405 (e.g., a microprocessor, ASIC, etc.), a CAN interface 410, and one or more electronic devices 415. In the construction shown, the electronic control device 415 is an electronic switch (e.g., a FET, an IGBT, a relay, etc.). In other constructions, the electronic control devices 415 can include combinations of electronic switches, stepper motor drivers, H-bridge interface chips, etc. In some constructions, the microcontroller 405 and the network interface 410 are integrated into a single chip (e.g., an ASIC). The microcontroller 405 receives inputs 420 from a plurality of switches (e.g., user actuated switches). The microcontroller 405 sends a status of the plurality of switches (e.g., on/off) to the BCM 125 via the network bus 235, in this case via the CAN interface 410. For some switch inputs, the microcontroller 405 drives an electronic switch 415 based on the position of the switch (or based on a command received via the network bus 235). For example, when a turn switch is engaged (e.g., indicating a driver's intention to turn), the microcontroller 405 receives an input from the switch indicating that it is engaged. The microcontroller 405 sends the position of the switch to the BCM 125 via the network bus 235, which flashes the rear turn lamp 205/210. The microcontroller 405 also drives the electronic switch 415 which provides power to the turn lamp 170/180 (i.e., the load) to light the lamp 170/180. For a turn signal, while the turn switch is on, the microcontroller 405 provides power intermittently (e.g., on for one second, off for one second) to cyclically flash the lamp 170/180. Other loads that are powered by electronic switches 415 include grip warmers 227, an adjustable windshield, etc. In some constructions, the microcontroller 405 drives the electronic switch 415 in response to the status of one or more of the plurality of switches. In some constructions, the microcontroller 405 drives the electronic switch 415 based on a command received via the network bus 235.

In some constructions, the microcontroller 405 sends signals to the BCM 125 (or other device) by means other than the network bus 235. For example, the microcontroller 405 can send a status of a run/stop switch to the BCM 125 either directly 425 or via an electronic switch 415. This connection can be in addition to sending the status via the network bus 235, and can operate as a redundant signal to increase a level of safety.

The microcontroller 405 can send the position of each switch to the BCM 125 on a continuous basis (e.g., every 5 to 50 msec) or can send an update on an event-driven basis (e.g., substantially immediately when a switch changes position transitioning from on to off or from off to on). The microcontroller 405 can also prioritize the transmission of messages to the BCM 125, for example to provide safety information as quickly as possible. In some constructions, a single message includes information on a plurality of switches. For example, a single byte can include the on/off status of eight switches.

The microcontroller 405 has the ability to interface with a variety of devices including momentary, toggle, rocker, center pivot, center push, etc. switches. In addition to simple on/off switches, the microcontroller 405 can interface with "smart" devices. For example, a devices can communicate with the microcontroller 405 serially to provide detailed information (e.g., a multi-position switch could provide information on the position of the switch as well as the previous position it transitioned from, or a device having a range, e.g., a potentiometer or pressure sensor, could provide position information).

The handlebar controller 400 reduces the number of wires running from the handlebar controller 400 to another device (e.g., a control module, the battery 130, etc.) of the motorcycle. In the constructions thus far, the number of wires is as low as four. In addition, the handlebar controller 400 enables modification of components on the handlebars without modifying the physical interface between the handlebars and the rest of the motorcycle. This allows one manufacturing setup for multiple different models of motorcycles. The handlebar controller 400 can also provide information to the BCM 125 via the network bus 235 to indicate the features and functions supported by a particular handlebar controller 400. The BCM 125 can be programmed to recognize all the different configurations and components for multiple handlebar control configurations thus reducing a quantity of different BCMs needed. The introduction of new components or functionality requires only that the software of the handlebar controller 400 and/or the BCM 125 be modified.

Figure 4A:
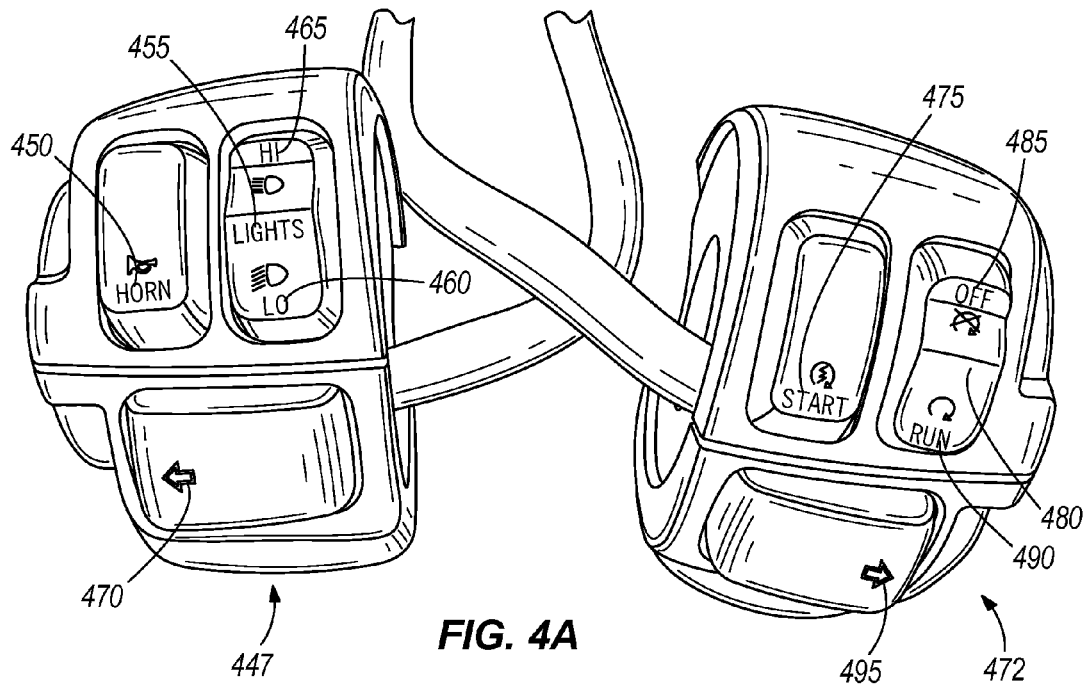
FIGS. 4A-4E are plan views of exemplary switch configurations for the handlebar controllers of FIGS. 2A, 2B, and 3.
Figure 4B:
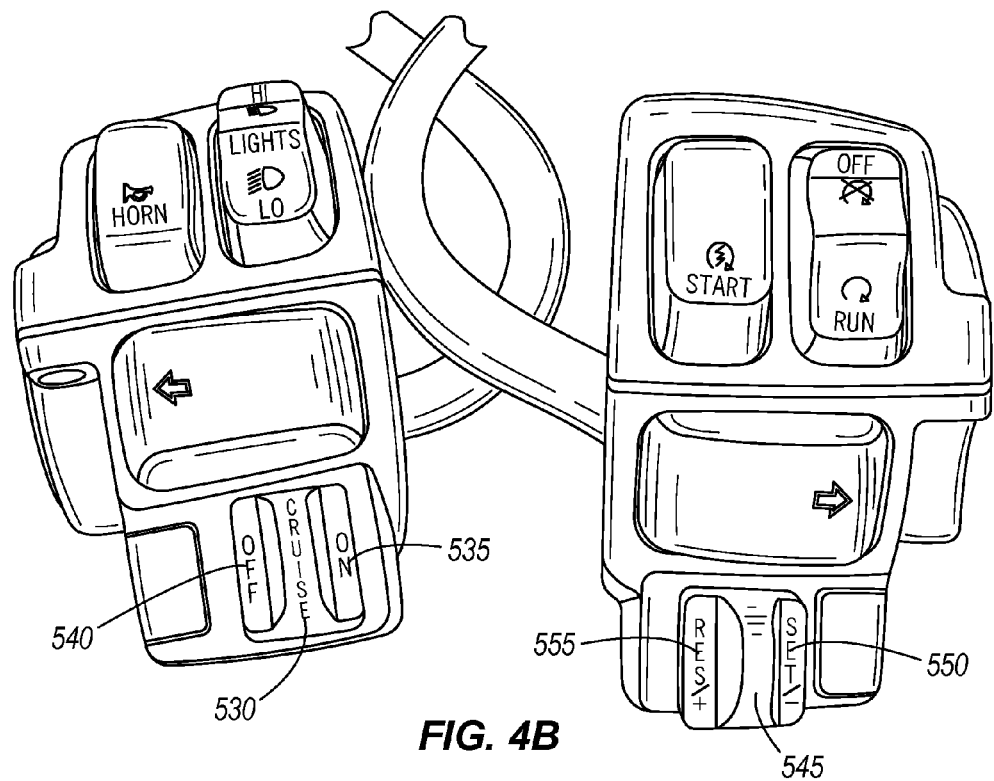
Figure 4C:
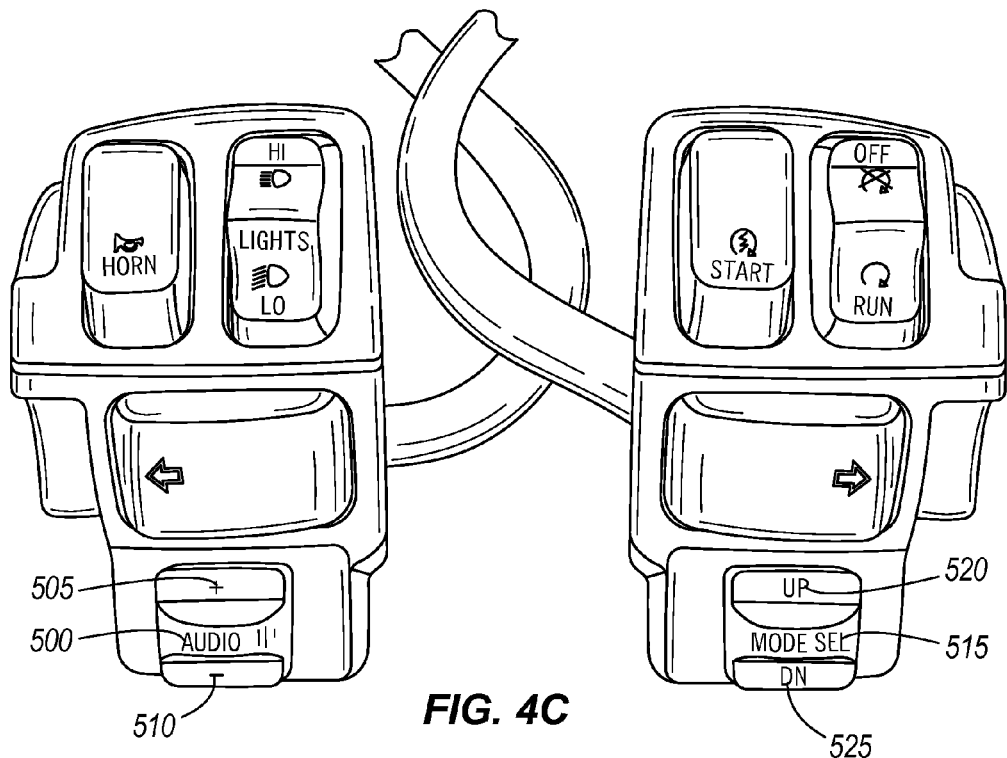
Figure 4D:
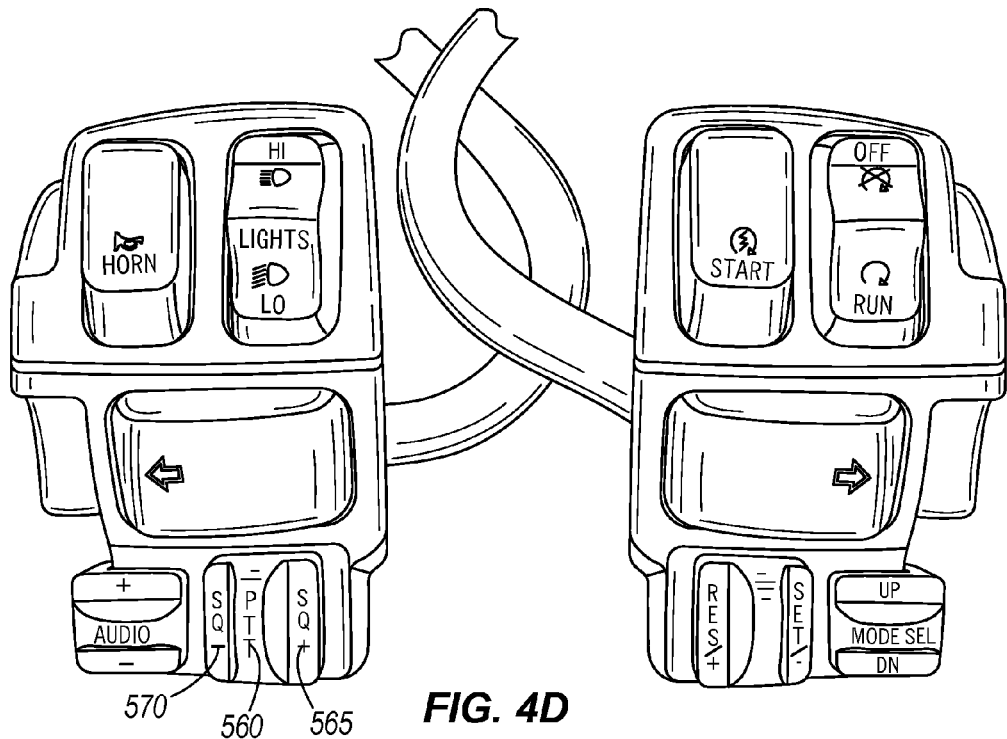

FIGS. 4A-4E show different switch configurations for different models/options of motorcycles. Integrated with each of the switch configurations is the handlebar controller 400. The physical interface between the handlebar controllers 105/110 and the rest of the motorcycle is the same for each of these configurations. FIG. 4A shows a basic switch configuration with a left-handlebar controller 447 including a momentary horn switch 450, a light switch 455 locking in either a LO position 460 or a HI position 465, and a momentary turn switch 470. A right-handlebar controller 472 includes a momentary start switch 475, a momentary run/off switch 480 having an OFF position 485 and a RUN position 490, and a turn switch 495.

Figure 4E:
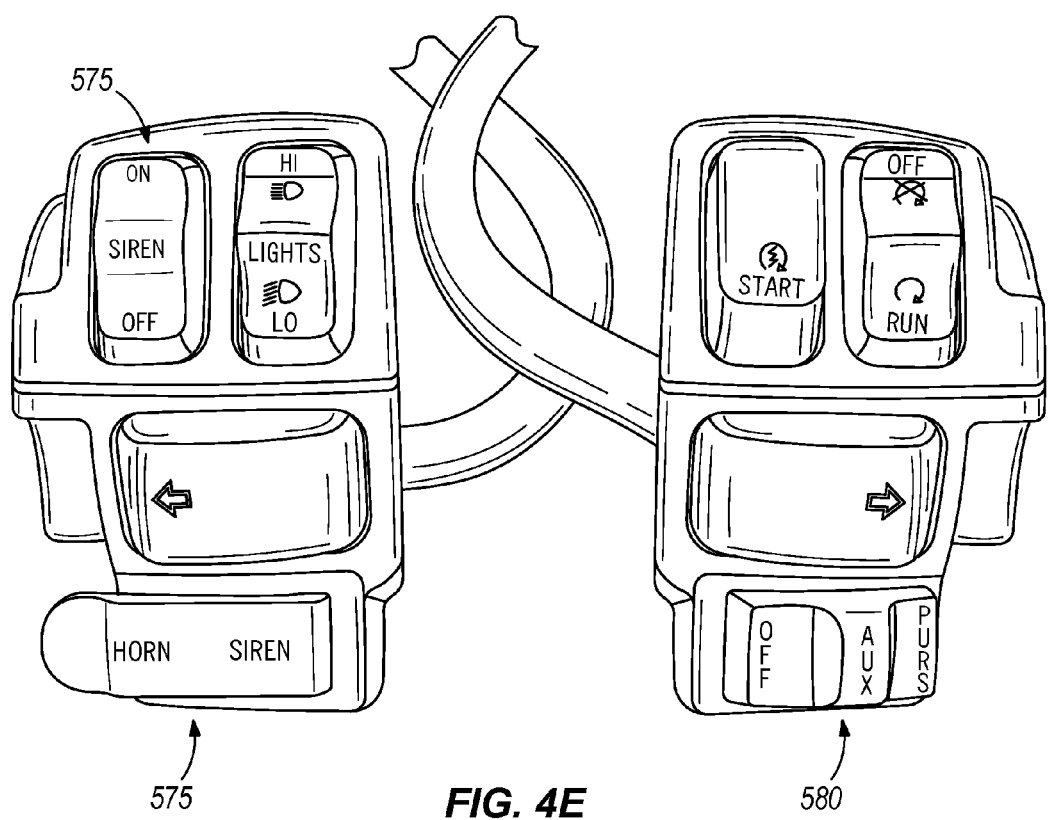

The other switch configurations shown include additional switches/functions such as a momentary audio switch 500 (FIG. 4C) having a "+" 505 and a "−" 510 position, a momentary mode select switch 515 (FIG. 4C) having an UP 520 and a DOWN 525 position, a momentary cruise control switch 530 (FIG. 4B) having an ON 535 and an OFF 540 position, a complementary momentary set/resume switch 545 with a SET 550 position and a RESUME position 555, a push-to-talk switch (PTT) 560 (FIG. 4D) having a push in position for PTT, and squelch "+" 565 and "−" 570 momentary positions. There are even configurations for police motorcycles that include siren and pursuit switches 575 and 580 (FIG. 4E). Other controls such as an adjustable windshield or an auto-shift function can also be incorporated into the handlebar controller.

Use of a network bus reduces the quantity of wires that must be run throughout the motorcycle including the handlebar piping and the frame. The reduction of wires results in easier manufacture and produces fewer problems during manufacture (e.g., less chance at a wire being pinched leading to an immediate or future failure of the wire). In addition, the reduction of wires results in a reduction of fuses necessary on the motorcycle.

In addition to handlebar controls, other controls are contemplated by the invention. For example, the instrument cluster 115 can include a plurality of switches, either in the cluster 115 or around the outside of the cluster 115 (e.g., four switches positioned vertically on the right and left sides of the cluster 115). The switches can provide control to the cluster 115 (e.g., for resetting a trip odometer, interfacing with a motorcycle computer, etc.) or to other devices on the motorcycle (e.g., a radio). A controller in or near the cluster 115, receives the status of the switches and controls a device and/or sends the status to another device via the network bus 235 (and in some cases via a direct connection) similar to the operation of the handlebar controls.

Thus, the invention provides, among other things, a smart handlebar controller for a motorcycle. Various features and advantages of the invention are set forth in the following claims.

What is claimed is:

1. A handlebar control system for a machine, the system comprising:
   a controller;
   a plurality of user actuated devices coupled to the controller;
   an electronic control device;
   a first connector having terminals coupling the controller to machine power and a network bus; and
   a second connector coupling the controller and the electronic control device,
   wherein the controller continuously transmits a status of at least one of the plurality of user actuated devices over the network bus to a control module of the machine.

2. The system of claim 1, wherein the network bus is a controller area network bus.

3. The system of claim 1, wherein the controller selectively-drives the electronic control device based on a status of the plurality of user actuated devices.

4. The system of claim 3, wherein one of the plurality of devices is a turn-signal switch.

5. The system of claim 4, wherein the controller sends a message to the control module of the machine indicative of the position of the turn-signal switch.

6. The system of claim 5, wherein the controller cyclically drives the electronic control device when the turn-signal switch is engaged, and wherein the electronic control device provides power to a front turn-signal lamp.

7. The system of claim 5, wherein the control module cyclically lights a rear turn-signal lamp when the turn-signal switch is engaged.

8. The system of claim 1, wherein the first connector includes a redundant terminal coupled to the controller.

9. The system of claim 8, wherein the redundant terminal is coupled to a control module of the machine.

10. The system of claim 8, wherein a second electronic control device-is driven by the controller and is coupled to the redundant terminal.

11. The system of claim 1, wherein the electronic control device drives a grip warmer.

12. The system of claim 1, wherein the controller includes a network interface coupled to the first connector.

13. A handlebar control system, comprising:
   a first handlebar controller including
      a controller,
      a network interface coupled to the controller,
      a plurality of user-actuated devices coupled to the controller,
      an electronic control device coupled to the controller,
      a first connector having terminals coupled to machine power and a network bus, the first connector coupled to the network interface, and
      a second connector coupled to the electronic control device; and
   a second handlebar controller including
      a second controller,
      a second network interface coupled to the second controller,
      a second plurality of user-actuated devices coupled to the second controller,
      a second electronic control device coupled to the second controller,
      a third connector having terminals coupled to machine power and the network bus, the third connector coupled to the second network interface, and
      a fourth connector coupled to the second electronic control device, wherein the controller sends a status of the plurality of devices to a machine control module via the network interface and the second controller sends a status of the second plurality of devices to the machine control module via the second network interface.

14. The system of claim 13, wherein the third connector includes a first terminal for supplying power to the second handlebar controller, a second terminal for coupling the second handlebar controller to ground, a third terminal for coupling the second handlebar controller to a first network bus line, a fourth terminal for coupling the second handlebar controller to a second network bus line, and a fifth terminal for coupling a redundant output of the second handlebar controller to a machine control module.

15. The system of claim 13, wherein the first connector includes a first terminal for supplying power to the first handlebar controller, a second terminal for coupling the first handlebar controller to ground, a third terminal for coupling the first handlebar controller to a first network bus line, and a fourth terminal for coupling the first handlebar controller to a second network bus line.

16. The system of claim 13, wherein the second connector is connected to a left turn-signal and the fourth connector is connected to a right turn-signal.

17. A handlebar control system for a machine, the system comprising:
   a controller;
   a plurality of user-actuated devices coupled to the controller;
   an electronic control device;
   a first connector having terminals coupling the controller to machine power and a network bus; and
   a second connector coupling the controller to the electronic control device,
   wherein the first connector includes a first terminal for supplying power to the controller, a second terminal for coupling the controller to ground, a third terminal for coupling the controller to a first network bus line, a fourth terminal for coupling the controller to a second network bus line, and a fifth terminal for coupling a redundant output of the controller to a machine control module.

18. A handlebar control system, comprising:
   a first handlebar controller including
      a controller,
      a plurality of user-actuated devices coupled to the controller,
      an electronic control device,
      a first connector having terminals coupling the controller to machine power and a network bus, and
      a second connector coupling the controller to the electronic control device; and
   a second handlebar controller including
      a second controller,
      a second plurality of user-actuated devices coupled to the second controller,
      a second electronic control device,
      a third connector having terminals coupling the controller to machine power and the network bus, and
      a fourth connector coupling the second controller to the second electronic control device,
   wherein the electronic control device includes a left turn-signal switch and the second electronic control device includes a right turn-signal switch.

19. A handlebar control system for a machine, the system comprising:
   a controller;
   a user-actuated device coupled to the controller;
   an electronic control device;
   a first connector having terminals coupling the controller to machine power and a network bus; and
   a second connector coupling the controller to the electronic control device,
   wherein the controller drives the electronic control device based on a status of the user-actuated device and sends the status of the user-actuated device to a machine control module via the network bus.

* * * * *